United States Patent [19]
Derby

[11] 3,954,508
[45] May 4, 1976

[54] HIGH TEMPERATURE THERMOCOUPLE PROBE

[75] Inventor: Howard Derby, Merrimack, N.H.

[73] Assignee: GTE Laboratories Incorporated, Waltham, Mass.

[22] Filed: Sept. 10, 1974

[21] Appl. No.: 504,780

[52] U.S. Cl. .............................. 136/233; 136/242
[51] Int. Cl.² ........................................ H01L 35/04
[58] Field of Search .................. 136/233, 232, 242

[56] References Cited
UNITED STATES PATENTS

| | | | |
|---|---|---|---|
| 2,335,358 | 11/1943 | Ray ...................................... | 136/233 |
| 2,843,646 | 7/1958 | Conant ................................ | 136/242 |
| 3,379,578 | 4/1968 | McTaggart et al. ................. | 136/242 |
| 3,539,400 | 11/1970 | Pustell ................................. | 136/233 |
| 3,811,958 | 5/1974 | Maurer ................................ | 136/233 |
| 3,867,205 | 2/1975 | Schley ................................. | 136/232 |

OTHER PUBLICATIONS

Journal of the Institute of Fuel, Vol. 12, Mar. 1939, p. 571.

*Primary Examiner*—Maynard R. Wilbur
*Assistant Examiner*—G. E. Montone
*Attorney, Agent, or Firm*—Irving M. Kriegsman; Leslie J. Hart

[57] ABSTRACT

A thermocouple probe for use in measuring high temperatures includes a ceramic rod having a pair of channels extending throughout the length of the tube, a pair of conductors of different material extending through the channels and being interconnected at one end of the rod, a titanium tube enclosing the rod, a ceramic tube enclosing a portion of the titanium tube and heat insulating, flexible tubing enclosing the conductors as they extend from the other end of the rod to a suitable electrical connector. Such a probe arrangement permits accurate sensing of temperatures in the range of 752° to 2012°F.

3 Claims, 5 Drawing Figures

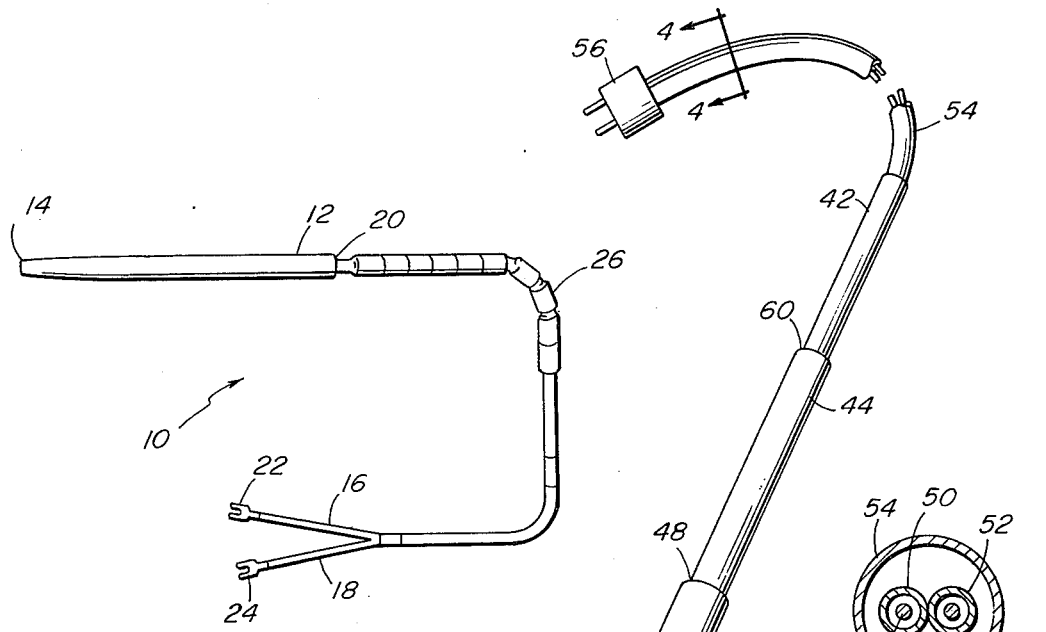
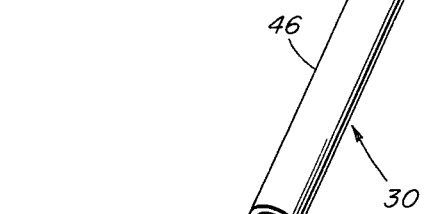
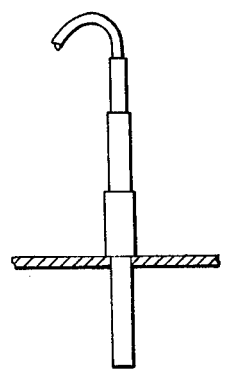
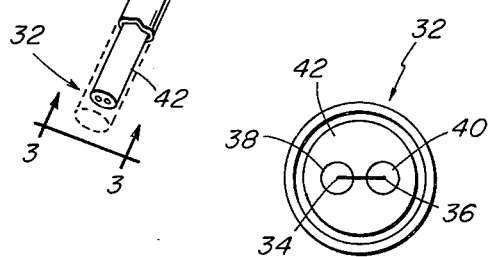
FIG. 1 (PRIOR ART)
FIG. 2
FIG. 3
FIG. 4
FIG. 5

HIGH TEMPERATURE THERMOCOUPLE PROBE

BACKGROUND OF THE INVENTION

The present invention relates to a thermocouple probe and, more specifically, to a probe for a thermocouple for accurately sensing high temperatures.

Some common physical properties which change with temperature are the length of a rod, the volume of a liquid, the electrical resistance of a wire, and the color of a lamp filament. All of these changes are utilized in the construction of various types of thermometers. Commonly used thermometers include the liquid-in-glass thermometer, the thermister, the optical pyrometer and the constant volume gas thermometer. Another commonly used thermometer is the thermocouple.

The thermocouple consists of an electrical circuit in which wires of any two unlike metals are joined at both ends to form a complete circuit. Whenever the two junctions of the wires are at different temperatures, an electromotive force exists in the circuit. In a typical application, one junction is maintained at a known, reference temperature, the other junction is placed in the region of the unknown temperature and the EMF is indicated on a suitable measuring device, such as a galvanometer. The junction which senses the unknown temperature may be formed into a thermocouple probe and is referred to commonly as the hot junction because thermocouples are usually used for measuring temperatures higher than room temperature.

In many areas of research and experimentation it is necessary to measure accurately high temperatures. In a typical area, the surface area of certain materials are analyzed at temperatures which may range from 400° to 1600°C. Such analysis is keyed on the ability to measure accurately the temperatures in this range. Typically, this range of temperature is generated by a suitable oven which may operate under reducing atmosphere conditions. The temperature probe must be inserted into the oven together with the sample to be analyzed. Commonly, thermister devices are used for sensing temperatures at this range. For example, a platinum resistance thermometer may sense temperatures up to 1760°C, the melting point of platinum. However, for reasons of economy, ease of use and optimum use of space for sensing temperatures, it is desirable to use the thermocouple for these temperature ranges.

It was found, however, that no thermocouple probes could be found which would accurately measure temperatures in the range of 400° to 1600°C. One thermocouple probe which was tried unsuccessfully included a chromel-alumel thermocouple, a double bore ceramic insulator, a stainless steel sheath and fiber glass sleeving at the cold end. The sleeving comprised a series of individual sleeves of short length stacked adjacent to one another around the length of the conductors extending from the cold end of the thermocouple to the electrical connector. Besides not accurately sensing the temperatures in this range, the available thermocouples of which the inventor is aware have other features which make them unsuitable for high temperature measuring. First, the probes do not have suitable means for being mounted in the oven. Also, the hot junction protrudes outwardly from the lower end of the probe and is therefor subject to being damaged. Lastly, no suitable means for handling the probe has been found. The probe jacket is much too hot to be picked up manually, and lifting the probe by the conductors subjects the conductors to undesirable stress.

SUMMARY OF THE INVENTION

According to the present invention, a high temperature thermocouple probe is provided in which the overall insulation of the probe has been enhanced, the result being a probe which may be used in the temperature range of 400° to 1600°C. It has been found that one of the main reasons for the failure of the probes in the prior art to operate effectively at this range, was that the heat insulation of the probe was inadequate to inhibit heat flow between the thermocouple conductors and the environment. The thermocouple itself, such as a chromel-alumel junction, may create the proper EMF in this high temperature range, but the integrity of the EMF became impaired as a result of inadequate heat insulation for the leads of the thermocouple junction.

The thermocouple probe of the present invention utilizes a titanium tube for jacketing a ceramic, double bore rod through which is threaded a chromel-alumel thermocouple junction. The titanium tube has several advantages over known material, such as stainless steel. Stainless steel reaches annealing temperature at approximately 1100°C thus making it an inadequate heat insulator for the ceramic rod at temperatures in excess of this temperature. Titanium may be used for temperatures up to 1700°C and in this range is fairly corrosion resistant. Perhaps more importantly, the minimum practical outer diameter of stainless steel tubing for use in high temperatures is about 1.57 cm. Titanium may be used with much smaller outer diameters, the smaller thickness of the tube wall providing lower heat conductivity and facilitating use in much smaller areas. This factor is important in environments where there is not very much room in the oven for insertion of the temperature probe. The conductors extending away from the cold end of the probe are each enclosed in a flexible tube, and both tubes are enclosed in a single flexible tube having heat insulating properties. The tubes reduce localized stress on the conductor leads. More importantly, the tube inhibit heat flow between the leads and the atmosphere. This heat flow has been found to degrade the accuracy of the thermocouple probe. In another feature of the invention, a region of the titanium tube is jacketed by a ceramic tube. The lower end of the ceramic tube may rest upon the top of the oven and thus provides a means for supporting the probe. In addition, the ceramic tube provides a low temperature surface for handling the probe.

BRIEF DESCRIPTION OF THE DRAWINGS

In the drawings:

FIG. 1 is an illustration of a prior art thermocouple probe;

FIG. 2 is an illustration of a thermocouple probe utilizing the principles of the present invention;

FIG. 3 is a view of the probe along lines 3—3 of FIG. 2;

FIG. 4 is a sectional view of the probe along lines 4—4 of FIG. 2; and

FIG. 5 is an illustration of the use of the outer ceramic tube of the probe.

DESCRIPTION OF THE PREFERRED EMBODIMENT

For purposes of comparison, FIG. 1 illustrates a conventional thermocouple probe, and FIG. 2 illustrates the probe utilizing the principles of the present invention. In FIG. 1, a thermocouple probe 10 includes a stainless steel sheath 12 which encloses a thermocouple hot junction formed by the interconnection at the end 14 of the sheath of a chromel and an alumel wire. A pair of leads 16 and 18 extend from a cold junction 20 of the sheath 12 and terminate at suitable connectors 22 and 24. The probe 10 may be connected to the remainder of the thermocouple circuit (not shown). Within the sheath 12, the thermocouple leads are threaded in a pair of channels in a ceramic rod (not shown). Between the cold junction 20 and the connector 22 and 24, the leads 16 and 18 are enclosed by a series of fiberglass sleeves 26. The probe 10 has been found to be inadequate for accurately measuring temperatures in the range of 400° to 1600°C.

In an exemplary embodiment of the present invention, as shown in FIGS. 2 and 3, a thermocouple probe, represented generally by the reference numeral 30, includes a thermocouple formed at a hot junction 32 at the lower end of the probe 30 which junction is formed by the interconnection of a chromel wire 34 and an alumel wire 36. Preferably, the wires are welded together with fluospar flux. The wires 34 and 36 are threaded through channels 38 and 40 which are formed throughout the length of a rod 42 which is made of a ceramic material. A titanium tube 44 which extends a slight distance beyond the end of the rod 42 at the hot junction 32 forms a protective region for the thermocouple. A rod 46 which is made of a ceramic material surrounds the central region of the titanium tube 44. Preferably, the end 48 of the ceramic tube 46 and the titanium rod 44 are bonded with a suitable adhesive material, such as ceramabond, to hold such members secure. The wires 34 and 36 extending from the upper end of the ceramic rod 42 are enclosed, as shown in FIG. 4, in a pair of flexible tubes 50 and 52, respectively, which are preferably made of teflon. These tubes 50 and 52 are then threaded through a heat insulating, flexible tube 54; one suitable material for the tube 54 is that known as var glass. The ends of the wires 34 and 36 are fastened to Cr-Al male connector 56 so that the probe may be connected to the remainder of the thermocouple circuit (not shown). Preferably, the upper end of the titanium tube 44 and the ceramic rod 42 are bonded together at 60 with a suitable high temperature adhesive, such as that known as ceramabond. A small piece of electrical glass tape (not shown) may be wrapped over the bonded surface.

The following comprise the dimensions of the components of the preferred embodiment of the present invention.

ceramic rod 0.317 cm OD, 0.102 cm ID, 25.4 cm long
titanium tube 44 0.475 cm OD, 0.428 cm ID, 22.8 cm long
ceramic tube 46 0.910 cm OD, 0.584 cm ID, 10.2 cm long There are several advantages to the particular features of the present invention. The titanium tube has good performance up to 1740°C and is fairly corrosive resistant; the metal acts as a protection for the 2 hole ceramic tube 42 since titanium is very resistant to thermal and mechanical shocks. Also the small cross section will not increase the potential of thermal conductivity. Titanium has a lower heat conductivity than steel. The ceramic tube 46 provides heat insulation from the titanium tube 44 and also serves as a means of supporting the thermocouple in a vertical orientation as it is inserted into a chamber, such as shown in FIG. 5.

The teflon tube provides narrow, bendable sleeving and good insulation. Although it has not been shown that a reducing atmosphere alters the thermoelectric properties of all thermocouple materials, it is observed that exposure of a thermocouple to such atmospheres is accompanied by a change in the chemical composition which seriously alters the reading of thermoelectric EMF. Therefore, the selection of a proper tube for completely covering the thermocouple wires is important. The high temperature adhesive for the ceramic has temperature limits as high as 1630°C. The insulating tube 54 is very flexible and provides good heat insulation for the cold end.

The embodiment of the present invention is intended to be merely exemplary and those skilled in the art will be able to make numerous modifications and variations of it without departing from the spirit of the present invention. All such modifications and variations are intended to be within the scope of the present invention as defined by the appended claims.

I claim:
1. A thermocouple probe for use in the measurement of temperatures ranging from about 752° to 2012°F comprising
   a, a pair of metallic wires of different material interconnected to one of their ends to define a hot junction of the probe,
   b, an elongated ceramic rod being formed with a pair of channels extending throughout the length of the rod, the wires being located in the channels and being of longer length than the rod so as to extend a distance out of the end of the rod opposite to the hot junction,
   c, an elongated titanium tube disposed securely around the ceramic rod, the tube forming a temperature protective covering for the ceramic rod,
   d, a heat insulating tube being securely disposed around a portion of the titanium tube to create a low temperature surface for handling the probe,
   e, a flexible, continuous heat insulating tube disposed around the wires extending out of the end of the rod opposite to the hot junction for impeding the transfer of heat from the wires extending from the rod, and
   f, a pair of flexible teflon tubes each being disposed around one of the exposed wires and within the flexible heat insulating tube for insulating the wires.
2. The probe according to claim 1 further including a high temperature adhesive material disposed between the titanium tube and the heat insulating tube for holding the tubes secure with respect to each other.
3. The probe according to claim 1 wherein the heat insulating tube further includes end means for forming a support surface to permit the probe to be aligned in a substantially vertical orientation.

* * * * *

UNITED STATES PATENT OFFICE
CERTIFICATE OF CORRECTION

Patent No. 3,954,508          Dated May 4, 1976

Inventor(s) Howard Derby

It is certified that error appears in the above-identified patent and that said Letters Patent are hereby corrected as shown below:

Column 2, line 46, delete "tube" and insert

--tubes--;

Column 4, line 36, delete "to" and insert --at--;

Signed and Sealed this

Thirteenth Day of July 1976

[SEAL]

Attest:

RUTH C. MASON
*Attesting Officer*

C. MARSHALL DANN
*Commissioner of Patents and Trademarks*